United States Patent [19]
Czichy et al.

[11] Patent Number: 6,076,939
[45] Date of Patent: Jun. 20, 2000

[54] ALIGNMENT DEVICE FOR ALIGNING AN OPTICAL TRANSMITTING BEAM WITH AN OPTICAL RECEIVING BEAM

[75] Inventors: Reinhard Hanno Czichy, Eggersriet; Edgar Fischer, Muellheim Dorf, both of Switzerland

[73] Assignee: Contraves Space AG, Zurich, Switzerland

[21] Appl. No.: 08/987,130

[22] Filed: Dec. 8, 1997

[30] Foreign Application Priority Data

Dec. 6, 1996 [CH] Switzerland ............................. 2988/96

[51] Int. Cl.[7] .............................. F21V 33/00; G02B 5/08; G02B 7/182
[52] U.S. Cl. .......................... 362/253; 359/857; 359/877; 359/848
[58] Field of Search ..................... 359/848, 850, 359/857, 858, 861, 862, 863, 865, 876, 877, 402, 405, 406, 895, 367, 872; 362/253

[56] References Cited

U.S. PATENT DOCUMENTS

| | | | |
|---|---|---|---|
| 3,713,728 | 1/1973 | Austin et al. | 359/848 |
| 3,753,322 | 8/1973 | Bordes | 359/848 |
| 4,227,776 | 10/1980 | Morton et al. . | |
| 4,451,729 | 5/1984 | Takagi et al. . | |
| 4,655,591 | 4/1987 | Kriz | 359/857 |
| 4,729,071 | 3/1988 | Solomon . | |
| 5,076,700 | 12/1991 | Decaprio | 359/848 |
| 5,227,921 | 7/1993 | Bleier et al. . | |
| 5,533,268 | 7/1996 | Keightley | 359/857 |
| 5,696,637 | 12/1997 | Shaffer | 359/857 |
| 5,841,592 | 11/1998 | Herren et al. | 359/819 |

FOREIGN PATENT DOCUMENTS 2 690 532   4/1992   France .

OTHER PUBLICATIONS

Dietrich G. Korsch "Reflective Optics II" *SPIE* vol. 1113 pp. 190–203 (1989).

Baister et al. "SOUT optical intersatellite communication terminal elegant breadboard" *IEE Proceedings Optoelectronics* vol. 142 No. 6 pp. 279–287 1995.

Skormin et al. "Mathematical modeling and simulation analysis of a pointing, acquisition, and tracking system for laser-based intersatellite communication" *Optical Engineering* vol. 32, No. 11 pp. 2749–2763 Nov. 1993.

*Primary Examiner*—Ricky D. Shafer
*Attorney, Agent, or Firm*—Townsend and Townsend and Crew LLP; Guy W. Chambers, Esq.

[57] ABSTRACT

The alignment device (10) is used for aligning an optical transmitting beam with an optical receiving beam. It comprises a rough alignment device and a fine alignment device. The rough alignment device has a first mirror (30.1), which can be rotated by approximately 360° around a first axis (14), in respect to which the first mirror (30.1) is set at 45° to the first axis. The rough alignment device furthermore has a second mirror (32.1), which can be rotated by approximately 180° around a second axis (16), in respect to which the second mirror (32.1) is set at 45° to the second axis. The second axis (16) can be rotated around the first axis (14), so that the second mirror (32.1) can be rotated within a spatial angle of approximately one hemisphere by the cumulative rotations around the axes (14, 16). The fine alignment device is constituted by a tiltable seating device (30.6 to 30.17) for at least one mirror (30.1), by means of which this mirror (30.1) is tiltably seated. The fine alignment device furthermore has an actuator device (30.18 to 30.19), by means of which the mirror (30.1) can be tilted in relation to its center normal line (15) within a spatial angle, which is considerably less than the hemisphere. At least the tiltably fastened one of the two mirrors (30.1, 32.1) is embodied with reduced mass.

13 Claims, 7 Drawing Sheets

ALIGNMENT DEVICE FOR ALIGNING AN OPTICAL TRANSMITTING BEAM WITH AN OPTICAL RECEIVING BEAM

FIELD OF THE INVENTION

The invention relates to an alignment device for aligning an optical transmitting beam with an optical receiving beam.

BACKGROUND OF THE INVENTION

Alignment devices of this type are preferably used as components of terminals which are employed for the reciprocal data transmission by means of optical connections in space. The alignment devices are used to align a transmitting beam emanating from a terminal with a beam emanating from a counter terminal and received by the first terminal. In this case the transmitting beam of the counter terminal is the receiving beam of the first terminal and vice versa, since the two terminals in principle perform the same functions and are therefore also essentially designed the same. It should be noted at this time that the terminals can also be earthbound installations, however, the advantages achieved by means of the instant invention are of importance in connection with terminals of the space satellite type in particular.

For several reasons the mentioned optical space connections are more advantageous for the transmission of data between two terminals than the directional microwave radio connections which are also employed for the purposes mentioned.

By means of optical space connections it is possible in particular to realize receiving and transmitting devices of low mass. Thanks to the comparatively short wavelength of light it is possible to emit an optical beam by means of an optical device of relatively small size over a narrow spatial angle. By means of the antenna gain obtained in this way it is possible to transmit high data rates even with a low transmission output. In contrast to this, the directional antennas required for directional microwave radio connections have a comparatively large size and mass, which represents an important disadvantage, particularly in connection with satellite terminals.

The advantageous option of making use of an optical device of small dimensions and therefore of low mass are based on the good collimating capability of optical beams, which surpasses the collimating capability of microwaves.

For one, the demands made on the accuracy of the alignment of the transmitting and receiving beams are high, because of the tight collimation of the beams or their emission over a narrow spatial angle range, and are also not easily met. This manifests itself already during the establishment of a connection between two satellite terminals, which does need to be made by the terminals themselves. Even after the establishment of a good connection, the collimation of the optical transmitting beam requires an appropriately exact alignment of the respective transmitting and receiving beams at every moment, or the appropriate tracking of the devices used for transmitting and receiving the beams.

An additional difficulty lies in that tracking requires not only comparatively continuous movements, but also that, for compensating mechanical vibrations which occur over a relatively wide frequency range and are caused by a terminal support or the satellite, the alignment device must also be able to perform corresponding high-frequency compensatory vibrations. The terminal is mounted on a support platform of the satellite; the latter moves freely in space and is not supported in any way, because of which it is not only not connected with any additional physical element, but is also not surrounded by an atmosphere. Therefore possibly occurring mechanical vibrations are not transmitted to the environment, such as is customary in connection with terrestrial installations. Because of this, there is the danger that the satellite, and of course the terminal along with it, is set to vibrate mechanically, namely by shocks induced, for example, by rocket drives, which are put into operation for orbit changes and orbit corrections, and by moving elements, such as stabilizing devices. These mechanical vibrations are of course transmitted to the terminal and thus to all components disposed in the terminal, therefore also to the components intended for the optical data transmission, by which the correct alignment of the transmitting beams or maintaining the receiving direction can be hampered, which requires an appropriate alignment later. Although this problem occurs in space in general, it has particularly grave consequences in connection with data transmission by means of optical beams because of their tight collimation.

There are several different partial operations within the totality of the alignment processes. When establishing a connection, i.e. prior to the start of data transmission, it is initially necessary to detect either a tightly collimated search beam emitted by the counter terminal, which possibly illuminates a relatively large spatial angle, or suitable natural light sources, for example constellations of stars, must be detected, which permit the highly accurate determination of their own position in space. Secondly, an accurate alignment of the transmitting beam with the search beam, or in relation to the spatial direction in respect to the mentioned light sources, must take place, also prior to the start of the data transmission. A third necessity is the permanent tracking of the alignment during the data transmission in order to be able to compensate erroneous deviations from the highly precise alignment, which can have several causes.

Furthermore, it is necessary in general during the alignment to take a relative movement between the terminal and a counter terminal into consideration. Up to now it was always assumed that no relative movement between the terminal and the counter terminal takes place. In this case the aim of the alignment is limited to aligning the transmitting beam exactly with the receiving beam. However, if there is a relative movement between the terminal and the counter terminal, the direction of the transmitting beam must slightly deviate from the receiving direction, i.e. it is necessary to include the keeping of a lead correction angle in the alignment. It is possible to omit the realization of a lead correcting angle, if the opening angle of the transmitting beam is greater than the required lead correction angle. In this case this omission must be paid for by an increased output demand on the transmitting laser, while maintaining the same output reserve.

The demands which are made on the alignment device are therefore very extensive; on the one hand it is necessary for a movement over a large spatial angle, approximately in the range of a hemisphere or possibly more, to take place, in order to detect a receiving beam at all even with an unfavorable placement; on the other hand, a very rapid movement must be possible in order to compensate even high-frequency vibrations of the receiving beam during tracking.

Since obviously an efficient device for the tracking of transmitting beams for the purpose of compensating high-frequency vibrations should, for dynamic and energetic reasons, have only a minimal mass which needs to be moved, but the total mass of the alignment device can not be arbitrarily minimized, a division of work and therefore also a division of the alignment device into two partial devices, which are intended to meet the two mentioned demands, was provided in a device of the type mentioned at the outset, which is described in FR-A1 2 690 532. A first partial device, which contains the largest portion of the mass of the entire alignment device and which is identified as a rough alignment device, permits movement over a wide spatial angle up to the range of a hemisphere, but without the possibility of performing high-frequency mechanical vibrations, so that it is not possible by means of this rough alignment device to provide a compensation of high-frequency mechanical vibrations of the terminal or satellite. The known rough alignment device is designed in the manner of a periscope and has two mirrors, wherein the transmitting ray is sequentially reflected at the first and second mirrors prior to being emitted. The direction of the transmitting beam is finally determined by the position of the second mirror, which can be rotated around a second axis in relation to the first mirror, while the first mirror, together with the second mirror, can be rotated around a first axis, and wherein the two axes extend orthogonally in respect to each other. A second partial device, whose mass should include only a very small portion of the entire alignment device and which is identified as the fine alignment device, is arranged on the first partial device, i.e. the rough alignment device, and moves together with it. In addition, the fine alignment device can move relative to the rough alignment device, namely at a high mechanical frequency but only within a very limited spatial angle.

A great disadvantage of the alignment device described by FR-A1 2 690 532 lies in that its total mass is large, wherein the mass moved by the fine alignment device in particular is too large for efficient tracking, even though it only contains one of the mirror devices.

OBJECT AND SUMMARY OF THE INVENTION

It is therefore the object of the invention to improve the known alignment device in accordance with FR-A1 2 690 532 by suitable means.

This object is attained by using at least one tiltable mirror of reduced mass.

In accordance with the invention, the tiltable mirror is so light that it is possible to realize the required high-frequency mechanical compensatory vibrations without problems. An additional advantage when using the mass-reduced mirror is to be seen in that not only the mirror itself, but also the installations for fastening the mirror and for its movement can be designed to be mass-reduced, so that the entire fine alignment device can optimally perform its functions because of its small mass.

Although the alignment device is in principle designed in such a way that it can be used for alignment within a spatial angle of at least one hemisphere, it can be designed in such a way that only narrower spatial angles can be detected. This has the particular advantage that it is not necessary to perform rotations around a full circle or, for practical reasons, even more than 360°.

It is recommended to embody not only the tiltable mirror, but also the other mirror to have a reduced mass.

The alignment device is preferably laid out in such a way, that the first mirror is tiltable in relation to the first axis, and the second mirror is fixedly arranged in relation to the second axis, although a reversed arrangement or the arrangement of two tiltable mirrors would also be conceivable. Due to the fact that the first mirror is tiltable, obvious advantages regarding sturdiness and dynamics are obtained. With such an arrangement a mass-reduced embodiment of the second mirror is particularly recommended.

An advantageous possibility for reducing the weight of the mirror consists in arranging recesses at its back, i.e. on the surface located opposite the reflecting layer of the plate-shaped substrate, which extend over almost the entire plate thickness.

It is particularly advantageous if the recesses are distributed over the entire surface in such a way that zones free of recesses are created between the recesses, which are arranged in such a way that they form a quasi support structure.

As already mentioned, fine alignment is based on at least one of the mirrors, in general the first or azimuth mirror, is seated so that it can be tilted in two axes, so that it is tiltable in respect to its normal center line, wherein the seating is preferably cardanic. The use of cardanic seating for the azimuth mirror is known from FR-A1 2 690 532, however, because of the use of the novel, weight-reduced mirror it is possible to provide a correspondingly improved cardanic seating. The latter is embodied to be low-mass and compact and has components which are simple to produce and therefore cost-effective.

An actuator device is provided for moving the azimuth mirror. The use of the mass-reduced mirror permits an advantageous, weight-saving design of this actuator device, too, with only two actuators, i.e. with respectively one actuator for tilting around two orthogonal tilt axes. However, an actuator device in the form of a spherical motor with a total of four actuators, namely with two actuators per tilt axis, has advantages because of the doubly symmetrical arrangement possible by this.

Although the mass reduction of the fine alignment device is particularly important, because only in this way can it perform its task regarding tracking in case of high-frequency mechanical vibrations, basically the lowest possible mass of each structural element of the alignment device is desired. Therefore the drive device of the rough alignment device, comprising a first motor for the azimuth axis and a second motor for the elevation axis, is already designed in a weight-saving manner in the prior art, as known from the frequently mentioned French patent application, by omitting gears and arranging the motors directly at the respective shafts. However, it must be considered to be a considerable disadvantage of the known alignment device that stepper motors were selected as the motors, which only allow movements in incremental steps, but not continuous movements. The latter are to be preferred mainly because they permit better control. Although there might be the possibility of using adapted stepper motors, whose function comes very close to continuously operating motors, the apparatus of such adapted stepper motors is complex and they are therefore preferably avoided. Solutions employing gears require highly precise and therefore expensive constructions. In this connection the backlash and the danger of cold-welding in case of a selection of unsuitable materials are particularly critical. For this reason, motors with a constant torque are preferably used for the alignment device in accordance with the invention, and are disposed directly at the appropriate shafts. Such motors permit continuous and exact movement, but are still simple, cost-efficient and light.

A problem which up to now has not been addressed is the need to lay out all structural elements of the alignment device in such a way that they are in a state suitable for use when they reach orbit, i.e. that they are not damaged while being transported by a carrier rocket, particularly during the starting phase of the carrier rocket, because of strong occurring inertia forces. To prevent such damage, which can be considered to be transport damage, locking devices for the moving elements of the alignment device were provided up to now, by whose use it was attempted to prevent excess strain on the moving elements during the mentioned critical starting phase. Such solutions are not satisfactory for several reasons. First, every locking device means an increase in mass which is undesirable, as already mentioned several times, and wherein it is particularly disagreeable that such an increase in mass does not lead to a permanently usable improvement of the terminal, but instead is caused by a device which is only used for a short time. Secondly, there is always the danger that after reaching orbit the locking devices can not be released in the planned way, but remain blocked, so that the alignment device is unusable from the start. Thirdly, particularly when seating the locking device in a certain position, this results in the bearings being one-sidely stressed during the starting phase, so that their useful life is shortened a priori, or that they must be made considerably larger, which again results in an undesirable increase in mass. All these problems can be avoided if the alignment device is designed in such a way that there is a complete dynamic balance, so that locking devices for the starting phase therefore become unnecessary.

In view of the problems occurring during the starting phase of the carrier rocket, it is furthermore particularly advantageous to short-circuit the electric motors during this starting phase, so that they act in the manner of an eddy current brake and the alignment device can move freely, while this movement is damped by the eddy current brake.

A further problem which manifests itself during the starting phase is the danger of contamination by various particles. Among others, these are coats of combustion gases emerging from the carrier rocket. Contamination of the mirrors has particularly unpleasant effects, and the coldest spots are as a whole the most endangered by contamination. It is known from FR-A1 2 690 532 to protect the exit area of the transmitting beam or respectively the inlet area of the receiving beam by means of a cylindrical cover, which extends, starting at the elevation mirror, around the beams. However, this cover is only provided as a sun protection or radiation protection against undesired radiation, but cannot prevent in any way the feared contamination during the starting phase of the carrier rocket. However, the contamination problem can be removed or at least greatly diminished by covering the surface of the end contour of the cover during the starting phase of the carrier rocket.

A cover element, which can be removed later, can be provided for this purpose, or the appropriate area of the alignment device is embodied to be adjustable, so that the corresponding surface or the end contour of the cover rests against a suitable surface of the terminal as long as there is danger of contamination. It is possible with a suitable design of the terminal to employ the motor for adjustment, since it is provided anyway for the elevation shaft.

As already mentioned, the terminal at which the alignment device is located, cooperates with a counter terminal, which in general is designed in the same way as the terminal, wherein both the terminal and the counter terminal simultaneously emit transmission beams and receive receiving beams emitted by the respectively other terminal. The different phases of the alignment which had been described above in connection with the terminal also take place in a corresponding way at the counter terminal. As already mentioned, the first phase of the alignment of the terminal consists in detecting a search beam which had been emitted by the counter terminal in a pre-phase. Of course, this emission of a search beam also takes place at the terminal itself. The first phase consists in attaining an approximate alignment, wherein the beam to be detected or, possibly natural light sources, such as constellations of stars, must be generally searched for over a wide spatial angle. It is obvious that the process of searching for the one beam is made easier if in this pre-phase a search beam, namely a so-called light beacon, is emitted by the counter terminal, whose radiated output is greater than the radiation which is customarily employed for data transmissions.

Since the emission of such a light beacon can lead to back-scattering and self-dazzling of the emitting terminal under certain circumstances, which is sought to be avoided, disentanglement of the paths of the light beacon from the remaining beams is advantageously provided, so that the light beacon goes out from a location outside of the actual beam path. A separate optical light beacon installation is provided to achieve this, which is flexibly connected by means of a fiber-optical wave guide with the offset beam source.

The light beacon installation should advantageously contain a device for connecting the conductors, which make the identical movements with the first mirror, and the conductors, which are rotatable in relation thereto and make the identical movements with the second mirror, in such a way that the conductors are not subjected to any stress. A light beacon conductor drum can be provided for this purpose.

Since the dependability of individual light beacons is generally less than the dependability of other components of the terminal, it is recommended to design the light beacon installation in such a way that it contains at least two light beacon units, which are alternatively usable.

Further details and advantages of the invention will be disclosed in what follows by means of the description of a preferred exemplary embodiment of the alignment device in accordance with the invention. In the representation of this exemplary embodiment the design and function of the control devices mentioned is not covered in detail. The description of the instant exemplary embodiment is made in connections with the drawings.

DETAILED DESCRIPTION OF THE PREFERRED EMBODIMENT

Figure 1A:
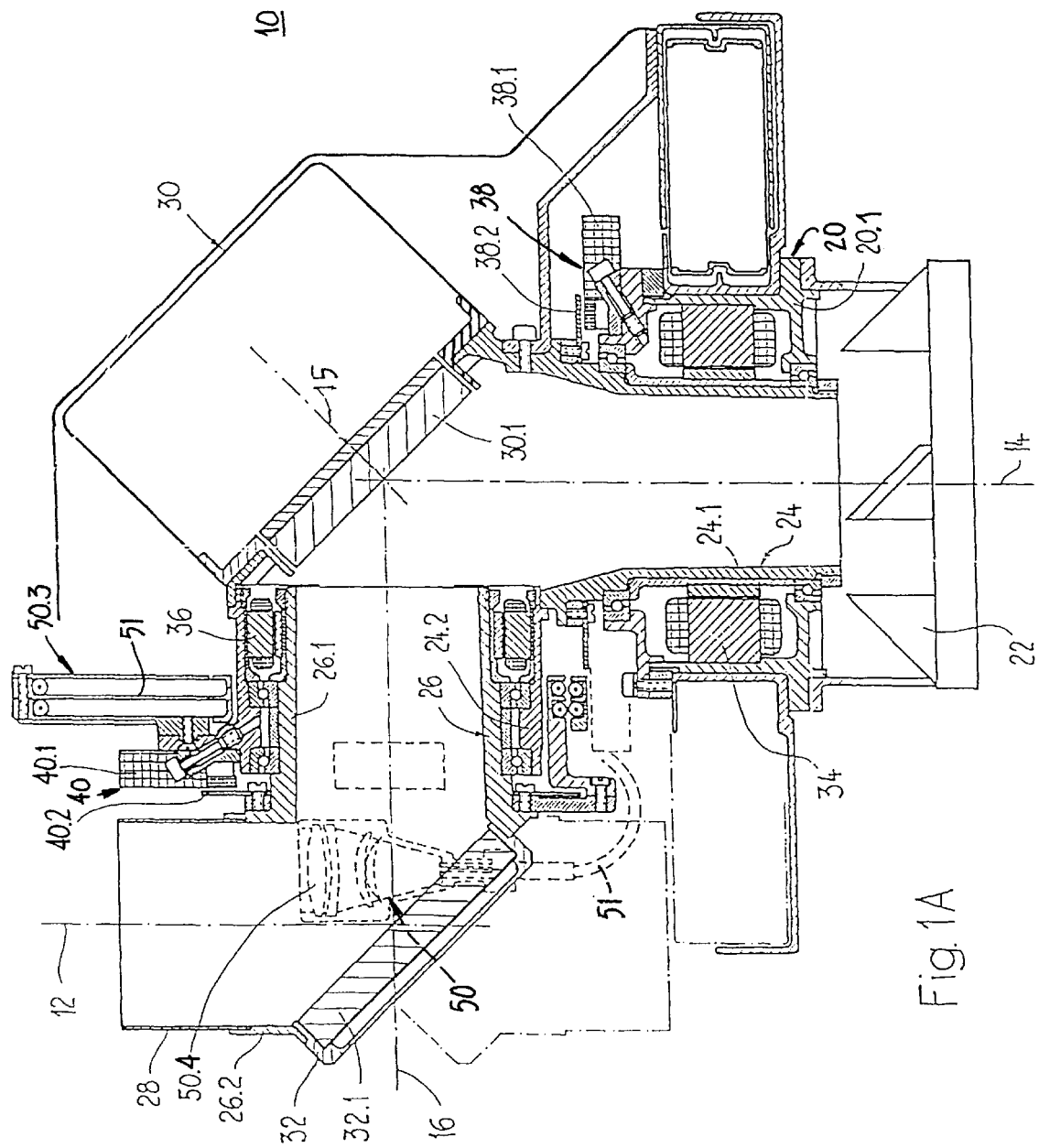
FIG. 1A represents an alignment device in accordance with the invention in a sectional view through both axes.

FIG. 1A represents an alignment device 10 for a terminal, not further shown, which is intended to be placed into an orbit in space by means of a carrier rocket, in order to be used there for optical data transmissions. The alignment device 10 is used for aligning a transmitting beam on a receiving beam, whose axis is identified by 12, emitted by a counter terminal. Within the scope of the instant description, the term alignment is understood to include all occurring alignment processes, i.e. the initial acquisition process for detecting the receiving beam and the process for improving and perfecting the beam alignment. These two processes occur prior to the start of data transmissions. The processes of tracking, by means of which deviations from the beam alignment once achieved are compensated during the actual data transmissions, are also a part of the alignment in the sense of the instant description.

The alignment device in accordance with the invention is embodied and acts in the manner of a periscope. Alignment takes place around two orthogonal axes wherein, following the terminology used in the artillery and missile field, the axis which is vertical in FIG. 1A is identified as the azimuth axis 14, and the axis which is horizontal in FIG. 1A as the elevation axis 16. The alignment device 10 has a structure 20 which, within the scope of the instant invention, is assumed to be fixed, on which an optical bench 22, which is also a part of the terminal, is fixed.

A vertical section 24.1 of a first rotating unit 24, which can be rotated around the azimuth axis 14, is disposed within a vertical section 20.1 of the structure 20. The rotating unit 24 furthermore has a section 24.2, which is bent at right angles in respect to the horizontal line and whose longitudinal axis is constituted by the elevation axis 16. A horizontal section 26.1 of a second rotating unit 26 is disposed inside this vertical section 24.1 of the first rotating unit 24, which can be rotated together with the first rotating unit 24 around the azimuth axis 14 and, in relation to the first rotating unit 24, around the elevation axis 16. In contrast to the alignment device known from the prior art, the horizontal section 26.1 of the second rotating unit 26 is very short. Because of this the mass, which is located eccentrically and at a relatively large distance from the azimuth axis 14 and which is, as will be described later, rotated around the azimuth axis 14, is reduced, which is advantageous for reasons of sturdiness and dynamics. For the same reasons the heavy components of the second rotating unit 26, one of which is a motor 34, which will be described in more detail later, are arranged as closely as possible to the azimuth axis 14. A short vertical section 26.2, bent vertically at right angles, adjoins the horizontal section 26.1 of the second rotating unit 26, whose axis essentially coincides with the axis 12. A hollow-cylindrical cover 28 is fastened to this short vertical section 26.2. A first mirror unit, which hereinafter will be identified as azimuth mirror unit 30, is fastened on the first rotating unit 24. The azimuth mirror unit 30 has a first mirror, hereinafter identified as azimuth mirror 30.1, whose central normal line is identified by 15 and whose reflecting surface is directed obliquely downward and respectively forms an angle of at least approximately 45° with the azimuth axis 14 as well as with the elevation axis 16. A further mirror unit, which is identified as the elevation mirror 32.1, is fastened on the second rotating unit 26. The elevation mirror unit 32 has a second mirror, which is identified as elevation mirror 32.1, whose reflecting surface is directed obliquely upward and forms an angle of at least approximately 45° with elevation axis 16 as well as with the axis 12.

Figures 2A, 2B:
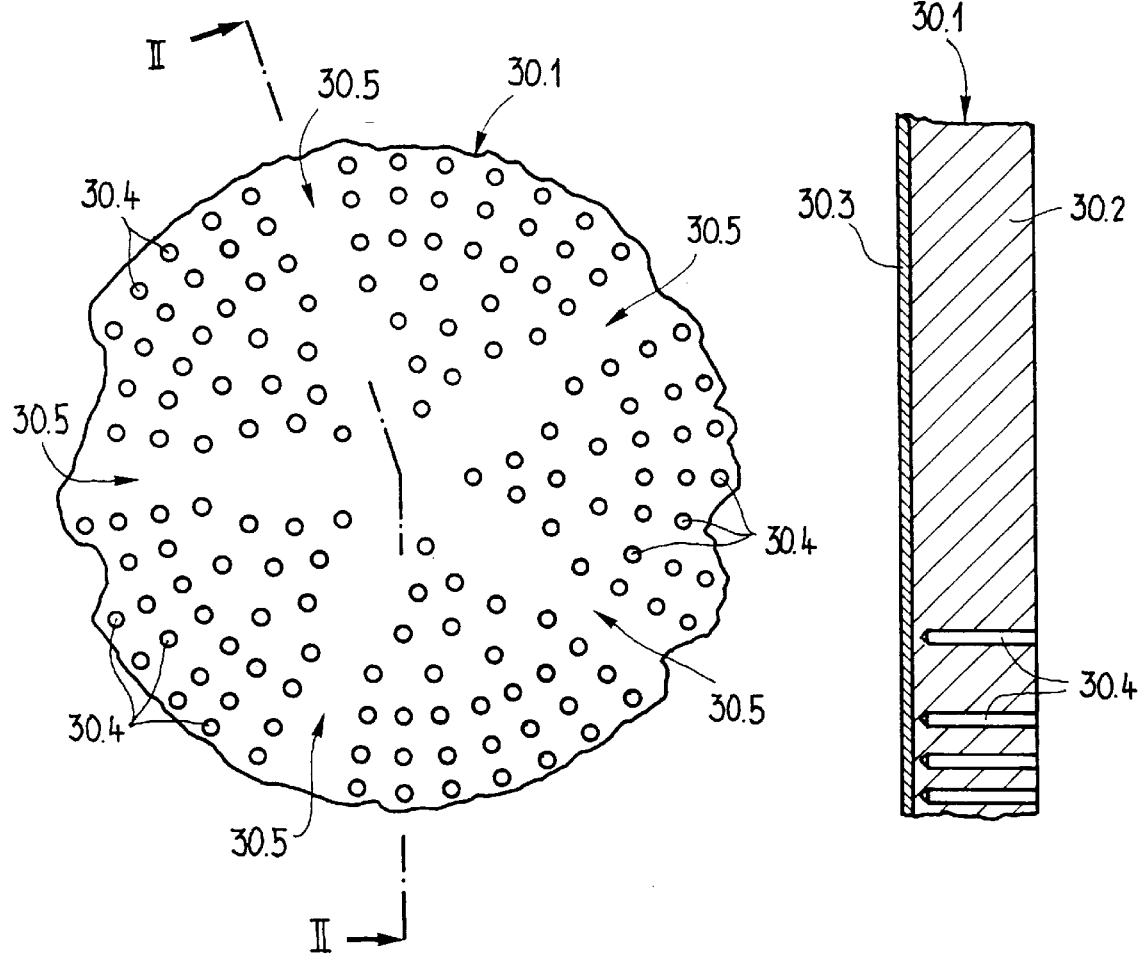
FIG. 2A shows a mass-reduced mirror from the back.
FIG. 2B represents the mirror shown in FIG. 2A in a section along the line II—II in FIG. 2A.

FIGS. 2A and 2B show the mass-reduced azimuth mirror 30.1, which is formed by a plate-shaped substrate 30.2 with a reflecting layer 30.3. It can be seen in FIG. 2B that the plate-shaped substrate 30.2 has recesses 30.4, starting at the surface located opposite the reflecting surface 30.3, which extend over almost the entire thickness of the plate-shaped substrate 30.2. FIG. 2B shows that the recesses 30.4 are arranged in such a way that zones 30.5, which are free of recesses, are provided between them, which form a supporting mirror structure. The elevation mirror 32.1 is embodied with reduced mass in the same or similar manner as the azimuth mirror 30.1.

A first motor 34 is used for the direct, continuous drive of the first rotating unit 24 in relation to the structure 20, wherein the relatively heavy components are arranged on the structure 20, so that only the relatively lighter components need to be moved. The second motor 36 is used for the direct continuous drive of the second rotating unit 26.

Both motors 34, 36 are motors with constant torque and therefore permit continuous rotation.

A coding device 38 is provided for detecting the respective position or rotation of the first rotating unit 24, a first element 38.1 of which is fastened on the structure 20, and a second element 38.2 on the vertical section 24.1 of the first rotating unit 24. A second coding device 40 is used for the corresponding purpose for the second rotating unit 26, a first element 40.1 of which is fastened to the first rotating unit 24 and a second element 40.2 to the horizontal element 26.1 of the second rotating unit 26.

Figure 3A:
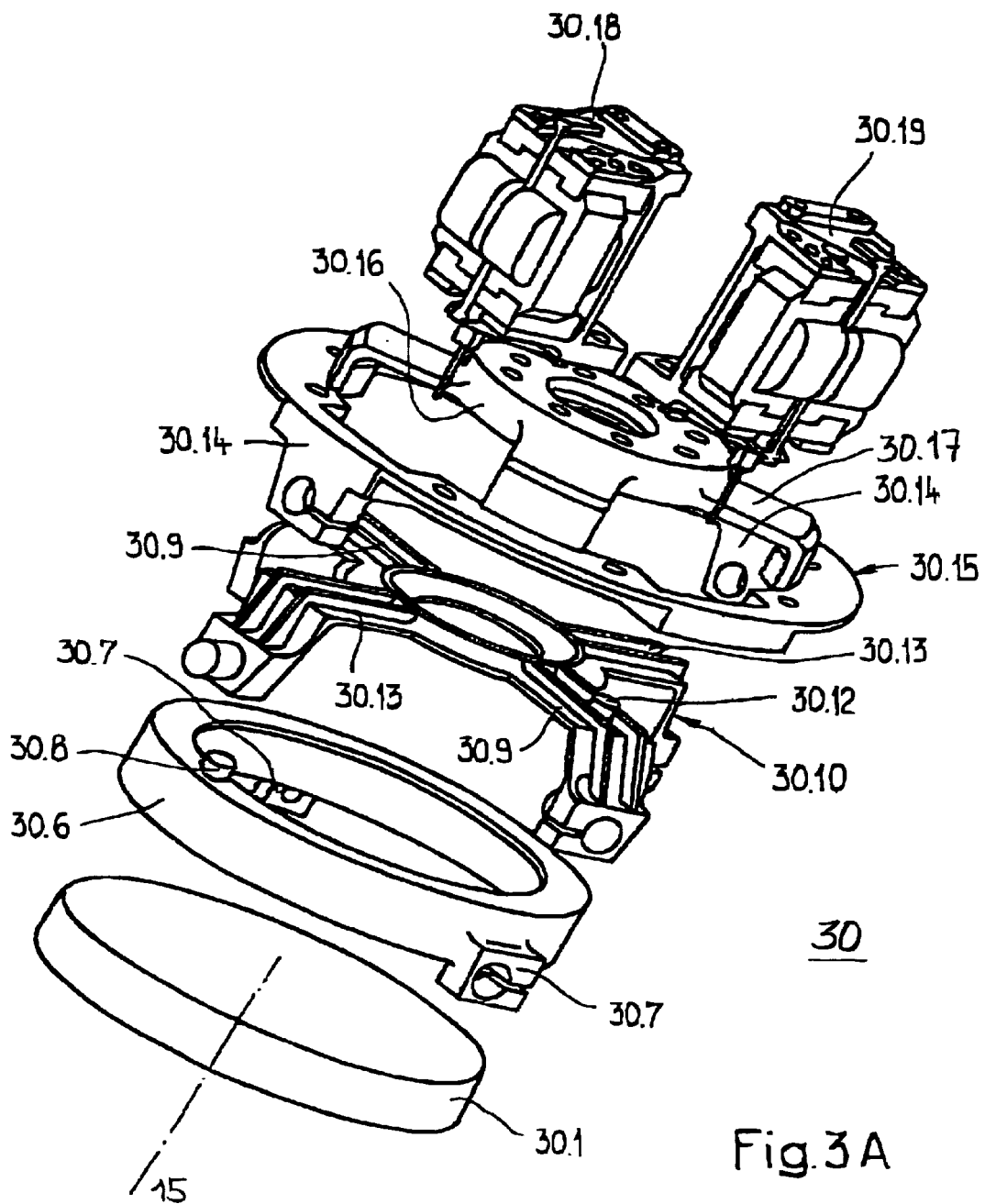
FIG. 3A is an exploded representation of the cardanic suspension of the mirror shown in FIGS. 2A and 2B, together with the actuator device.
Figure 3B:
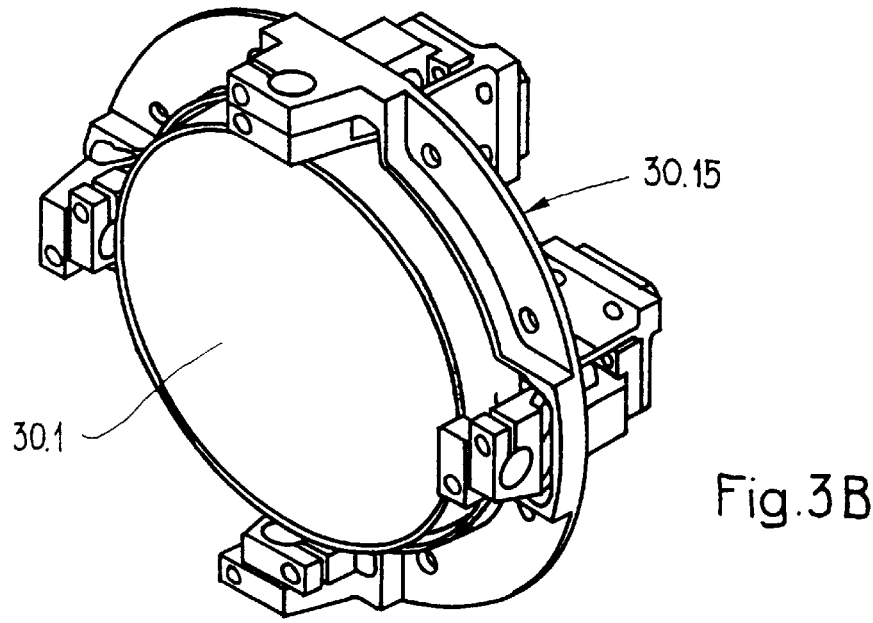
FIG. 3B represents the cardanic suspension shown in FIG. 3A with the actuator device in the mounted state in a diagram.
Figure 3C:
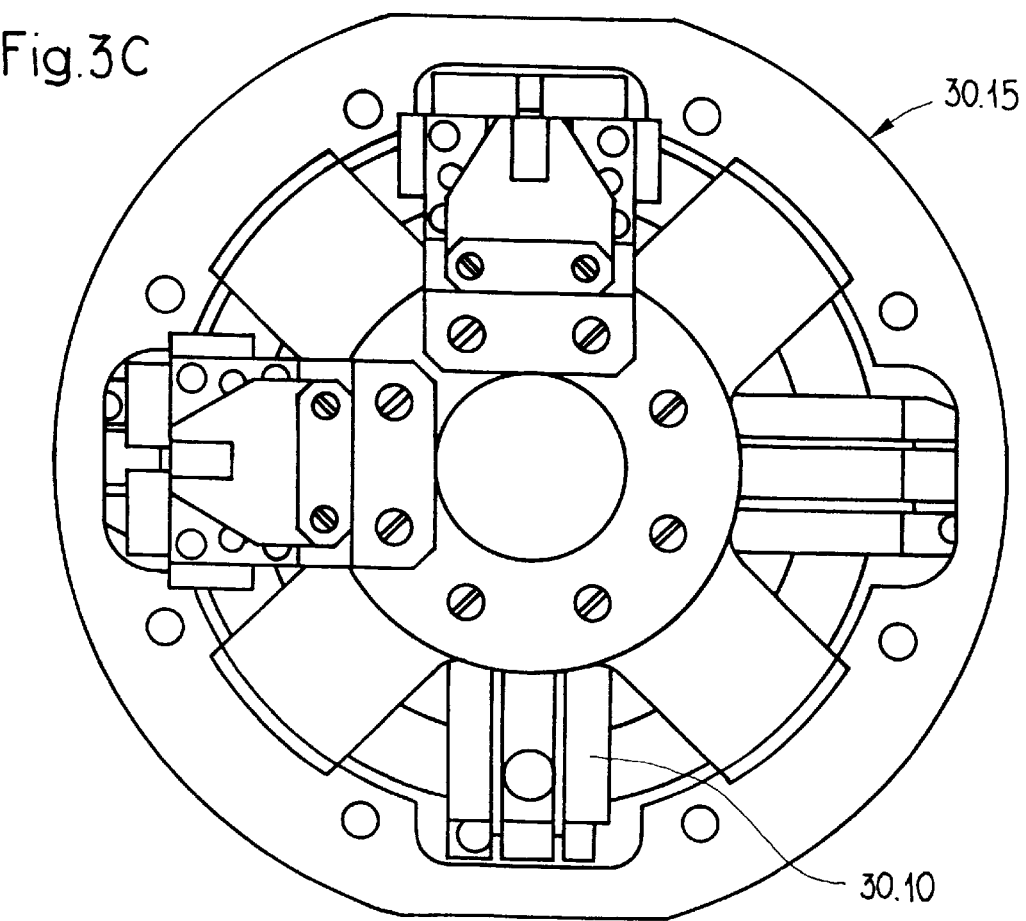
FIG. 3C shows the cardanic suspension represented in FIGS. 3A and 3B with the actuator device, viewed from the actuator side.
Figure 3D:
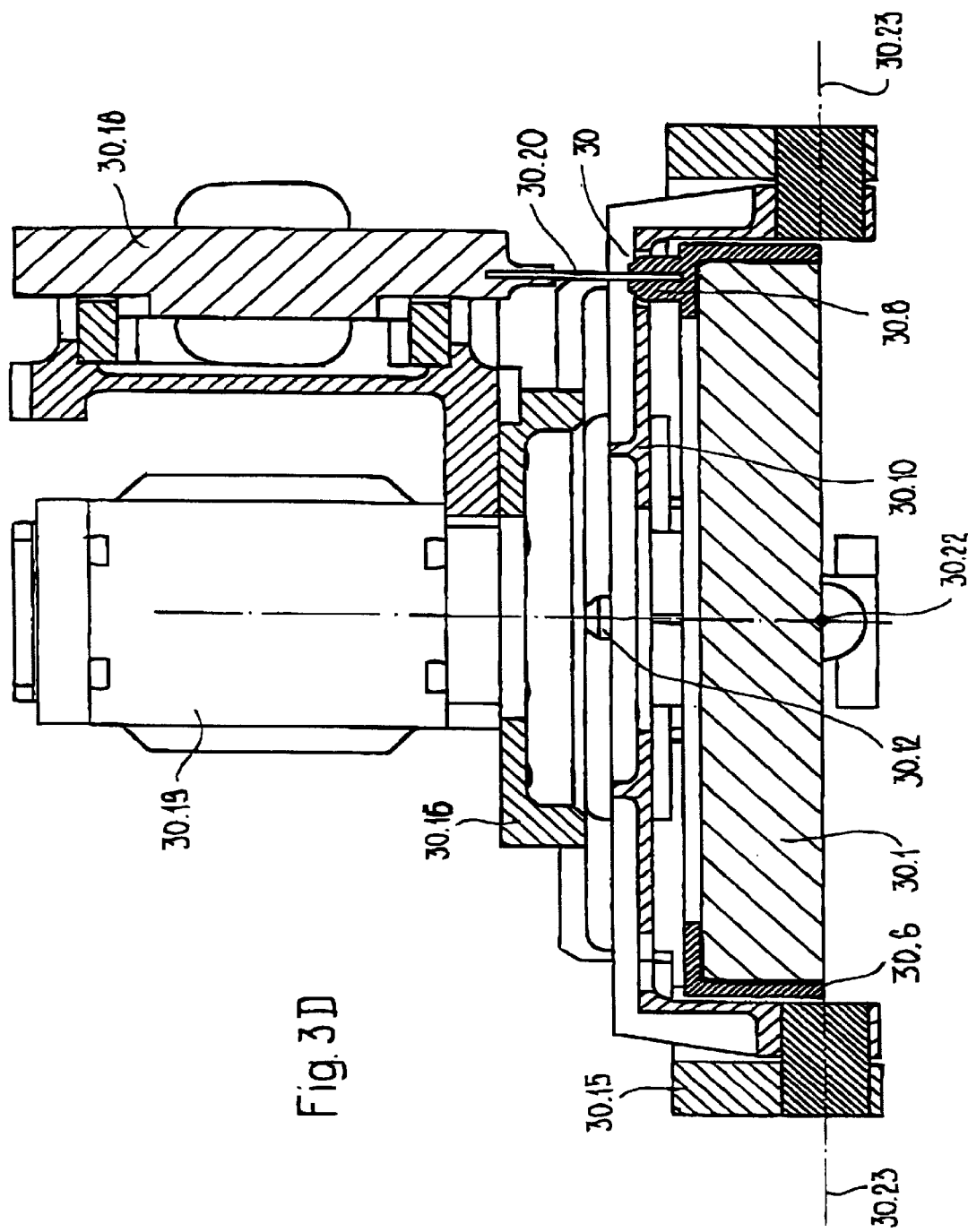
FIG. 3D shows the cardanic suspension represented in FIGS. 3A to 3C with the actuator device in a section transversely to the mirror.

FIGS. 3A to 3D show details of the azimuth mirror unit 30. The azimuth mirror 30.1, which is represented in a simplified way as a disk with the center normal line 15, is received in a circular mirror mounting 30.6. The latter has two diametrically disposed shoulders 30.7 and a projection 30.8. The shoulders 30.7 of the mirror mounting 30.6 are rotatingly connected with a cardanic cross 30.10 by means of two diametrical arms 30.9 of the latter. One of the arms of the cardanic cross 30.10 has a projection 30.12, which is embodied essentially the same as the projection 30.8 of the mirror mounting 30.6. The cardanic cross 30.10 is furthermore rotatably connected with shoulders 30.14 of a cardanic ring 30.15 by means of two further arms 30.13, each of which is disposed centered between the arms 30.9. A center element 30.16 of this cardanic ring 30.15 is fastened via four connecting bars 30.17, bent at right angles, and is used as the fastening platform for two actuators 30.18, 30.19. In FIG. 3A the actuators are rotated out of their work position in accordance with FIG. 3C, so that the central part 30.16 of the cardanic ring 30.15 can be better seen. The actuators 30.18, 30.19 and the cardanic ring 30.15 make the same movements as the first rotating unit 24, the cardanic cross 30.10 is rotatable or respectively tiltable in respect to the cardanic ring 30.15, and the mirror mounting 30.6 is rotatable or respectively tiltable in respect to the cardanic cross 30.10. As can be seen from the sectional view in accordance with FIG. 3D, a wire 30.20, which originates at the actuator represented at the right there and which can be moved up and down by this actuator, is fastened in the projection 30.8 of the mirror mounting 30.6. In the same way a wire originating at the other actuator, but not represented, which can also be moved up and down, is fastened on the projection 30.12 of the cardanic cross 30.10. Movements of the wire 30.20 result in the mirror mounting 30.6 performing a rotating movement around the axis 30.22, which appears as a dot in the sectional view. Movements of the not represented wire result in the cardanic cross 30.10 rotating around the axis 30.23. Because of the mass-reduced embodiment of the azimuth mirror 30.1 as well as the light construction of the entire cardanic mirror suspension it is possible to make do with only two actuators. However, the wire 30.20 and the not represented wire must be of such dimensions that they can also be stressed by other than tension. It is therefore possible to use thin plates or small tubes in place of wires, if desired.

A further possible embodiment which sees to the symmetrical excitation of the azimuth mirror 30.1 has the advantage that it significantly reduces the cross coupling between the two axes.

The purpose of the entire arrangement described above is that, with an optimal alignment, a transmitting beam originating at the optical bench 22 (FIG. 1A), or its longitudinal center axis, essentially moves along the azimuth axis 14, thereafter following reflection at the azimuth mirror 30.1 along the elevation axis 16 and, following further reflection at the elevation mirror 32.1, along the axis 12, while a receiving beam emitted by the counter station and destined for the instant terminal takes the opposite path. This optimal alignment is a prerequisite for a perfect data transmission.

The alignment is split into a rough alignment and a fine alignment, wherein generally the rough alignment takes place at the start of the establishment of the connection, while the fine alignment takes place in the end phase of the establishment of the connection and after the establishment of the connection during data transmission.

The rough alignment takes place by movement of the two rotating units 24, 26, wherein it is also possible, depending on the placement of the terminal and counter terminal, that only one of the rotating units 24, 26 need to be moved, or that the rough alignment can be omitted. Because of the required, rather slow and continuously occurring rotation of the rotary units 24, 26 around their axes 14, 16, the azimuth mirror 30.1 and the elevation mirror 32.1 reach positions in which there is an although not perfect, but well approximated alignment of the transmitting beam with the receiving beam. This alignment process which takes place within a large spatial angle in the range of a hemisphere, is called rough alignment. By means of this, an exact alignment in a very narrow spatial angle of approximately ±0.1° or less is achieved.

The fine alignment then takes place within this narrow spatial angle by means of the required tilting of the azimuth mirror 30.1 around its center normal line 15. The movement of the azimuth mirror 30.1 therefore needs to take place only within narrow limits in accordance with the narrow spatial angle of maximally ±0.1 , but with the option of performing mechanically high-frequency compensatory vibrations for assuring tracking during data transmission in case of vibrations of the counter terminal and thus of the receiving beam. However, it is not impossible that during data transmission deviations from the optimal alignment also take place, which are located outside of the mentioned spatial angle range of the fine adjustment and therefore require an actuation of the rough alignment.

Figure 1B:
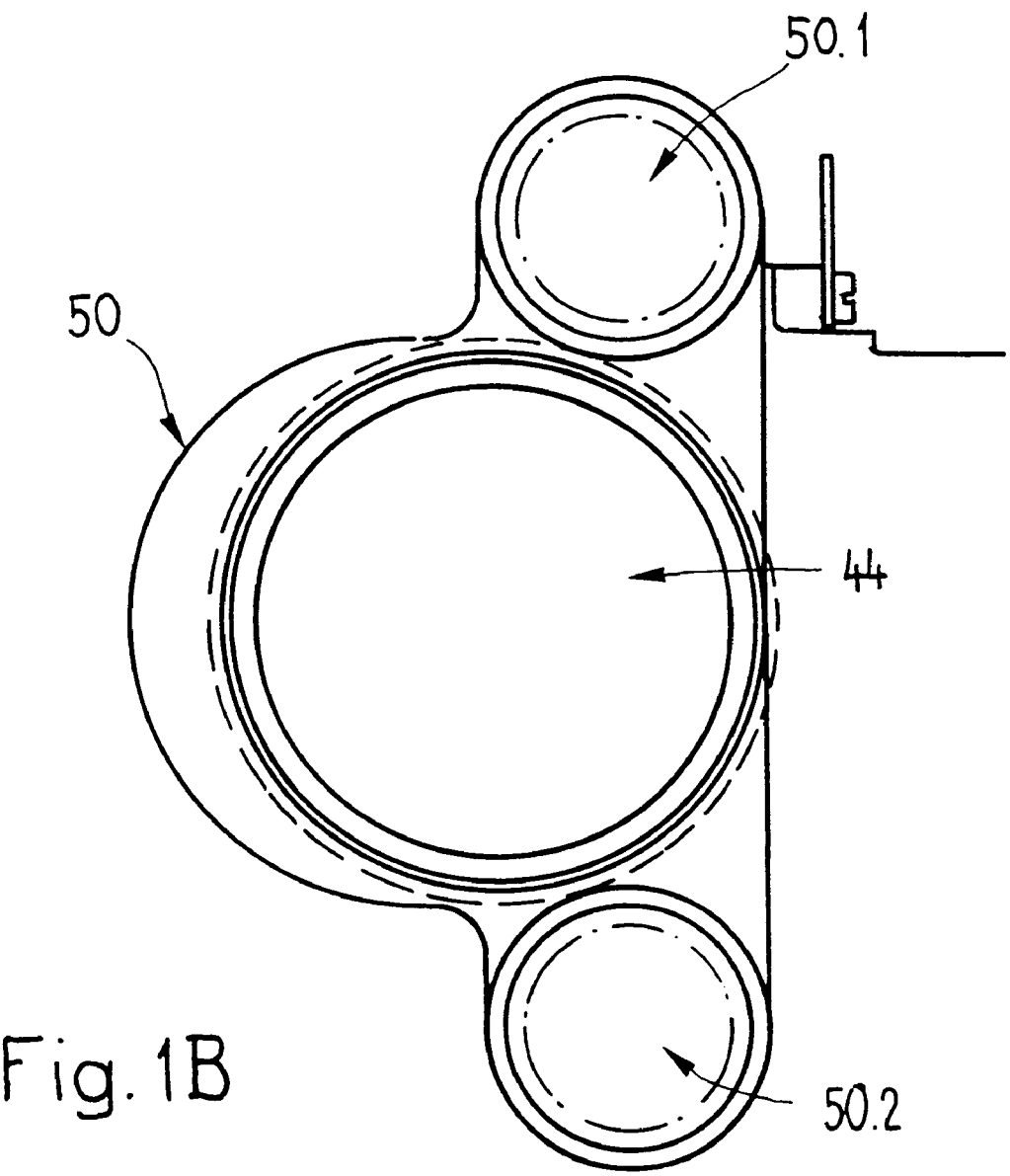
FIG. 1B represents a section along the line I—I in FIG. 1A.

In accordance with FIG. 1B, a light beacon installation 50, with emission element 50.4, is arranged on the second rotating unit 26 outside the space of the receiving and transmitting beams, is provided for the emission of an initial search beam for the counter terminal, whose output lies considerably above the output of the otherwise emitted beams and which is therefore easily detected by the counter terminal. The initial search beam is emitted starting at the beginning of the above described rough alignment and makes the start of the rough alignment of the counter terminal easier. As can best be seen in FIG. 1B, the light beacon installation 50 is located outside of the area 44 intended for the remaining beams, because of which back-scattering and dazzling in the area of the customary beam space are avoided. A separate arrangement of the light beacon device is also recommended for thermal reasons. In a representation in accordance with FIGS. 1A and 1B, a first light beacon emitter 50.1 is located behind and a second light beacon emitter 50.2 in front of the elevation mirror unit 32 (FIG. 1A), the vertical short section 26.2 of the second rotating unit 26 and the hollow cylindrical cover 28. The disposition of at least two light beacon units is recommended because of their susceptibility to trouble and for reasons of the desired dynamic balance. A fiber-optical reflecting guide 50.3, which is disposed on the second rotating unit 26, is provided for the connection with the light beacon installation 50 of conductors 51 making the same movement as the first rotating unit 24 and of conductors 51 making the same movements as the light beacon installation 50.

Figure 4:
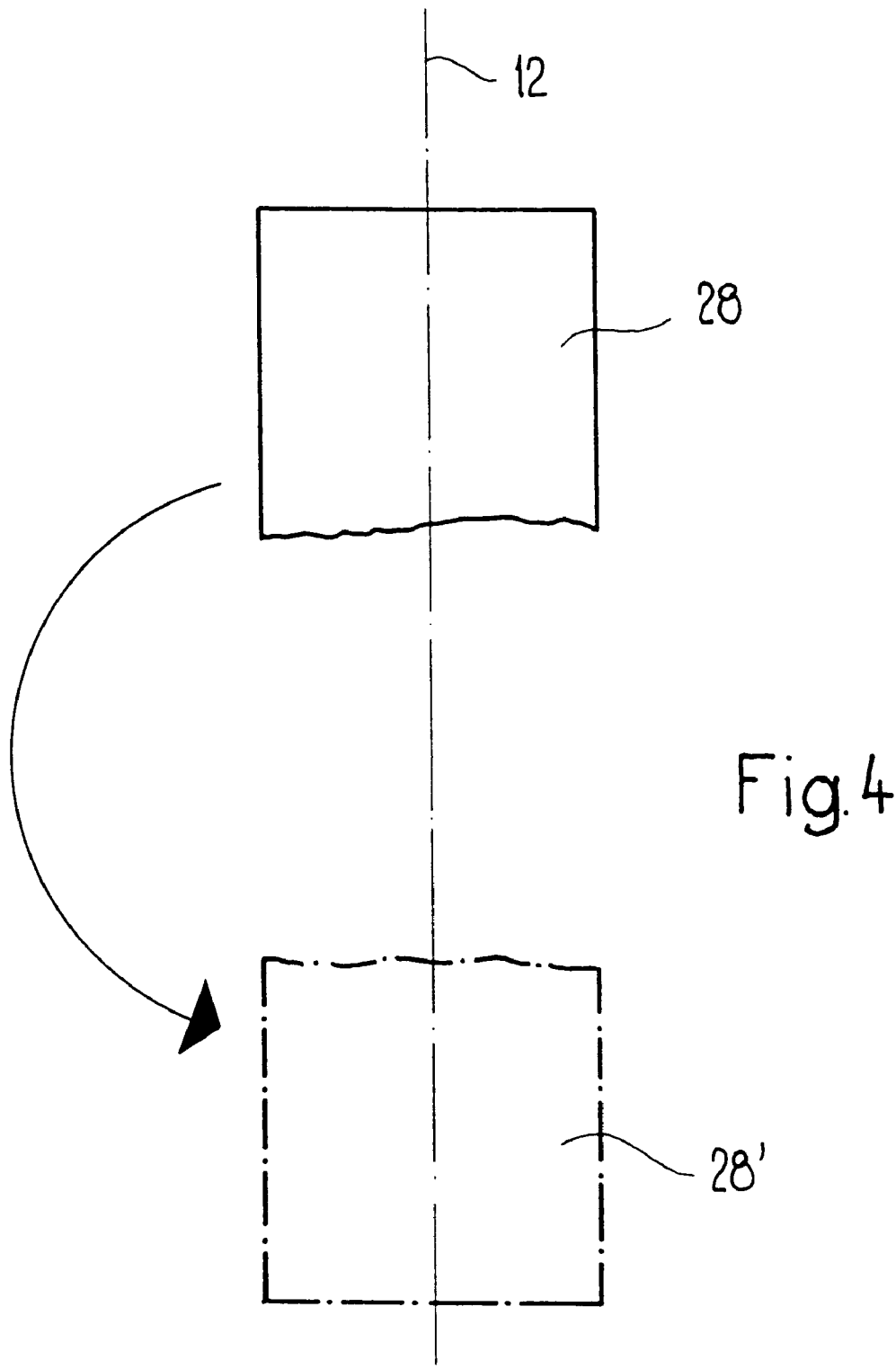
FIG. 4 represents the second rotating unit with a cover in two different positions.

FIG. 4 represents the vertical short section 26.2 of the second rotating unit 26 and the cover 28, which extend vertically upward in FIG. 1A, in another position, in which they are turned vertically downward. During the starting phase of the carrier rocket the section 26.2 is turned into this position, wherein the end contour 28 of the cover 28 is as close as possible to the wall 60 in order to prevent contamination of the interior of the alignment device 10 by propellant gas deposits and other particles.

Further essential details can be found in the drawing figures and do not require any additional explanations.

What is claimed is:

1. An alignment device at a first terminal for facilitating initial detection of said first terminal by a second terminal and aligning optical beams conveyed between said first and second terminals comprising:

a light beacon installation at said first terminal for transmitting a search beam to facilitate initial detection of said first terminal by said second terminal, a rough alignment device at said first terminal for roughly aligning optical beams conveyed between said first and second terminals comprising a first mirror which is rotatable around a first axis in relation to an optical unit and is at an angle of at least approximately 45° in respect to the first axis, a second mirror which is rotatable around a second axis oriented transversely in respect to the first axis and is at an angle of at least approximately 45° in respect to the second axis of rotation, wherein the second axis can be rotated around the first axis for moving the second mirror within a spatial angle inside the area of a hemisphere, and a fine adjustment device at said first terminal for more finely aligning optical beams conveyed between said first and second terminals comprising a tiltable seating device for said first mirror in order to fasten said first mirror in a tiltable manner, an actuator device for tilting the tiltably seated first mirror in relation to its center normal line inside a spatial angle which is considerably narrower than the hemisphere, and wherein the tiltably seated first mirror is embodied with reduced mass.

2. The alignment device in accordance with claim 1, wherein the tiltably seated first mirror is comprised of a plate-shaped substrate having mass reducing recesses and attached to a reflecting layer.

3. The alignment device in accordance with claim 2, wherein said mass reducing substrate recesses are arranged in such a way that the remaining mass of said substrate forms a support structure for said reflecting layer.

4. The alignment device in accordance with claim 1, wherein the tiltably seated first mirror is received in a cardanic device.

5. The alignment device in accordance with claim 1, wherein a plurality of actuator devices are provided to move the tiltably seated first mirror.

6. The alignment device in accordance with claim 1, wherein said first mirror is arranged on a first rotating unit and said second mirror on a second rotating unit, and that each of said first and second rotating units is powered by a direct drive motor of constant torque.

7. The alignment device in accordance with claim 6, wherein the first and second rotating unit motors can be short-circuited in order to act as eddy current brakes.

8. The alignment device in accordance with claims 6, wherein said second rotating unit can be rotated into a position to help prevent contamination of the interior of the alignment device.

9. The alignment device in accordance with claim 6, further comprising a hollow pivotable cylindrical cover associated with said second rotating unit to help prevent contamination of the interior of the alignment device.

10. The alignment device in accordance with claim 6, wherein said light beacon installation has an emission element arranged on said second rotating unit outside of the space of the optical beams.

11. The alignment device in accordance with claim 1, wherein said alignment device is dynamically balanced so that it can be free of locking devices despite exposure to severe vibration.

12. An alignment device at a first terminal for facilitating initial detection of said first terminal by a second terminal and aligning optical beams conveyed between said first and second terminals comprising:

a rough alignment device at said first terminal for roughly aligning optical beams conveyed between said first and second terminals comprising a first mirror arranged on a first rotating unit which is rotatable around a first axis in relation to an optical unit and is at an angle of at least approximately 45° in respect to the first axis, a second mirror arranged on a second rotating unit which is rotatable around a second axis oriented transversely in respect to the first axis and is at an angle of at least approximately 45° in respect to the second axis of rotation, wherein the second axis can be rotated around the first axis for moving the second mirror within a spatial angle inside the area of a hemisphere, and a fine adjustment device at said first terminal for more finely aligning optical beams conveyed between said first and second terminals comprising a tiltable seating device for said first mirror in order to fasten said first mirror in a tiltable manner, an actuator device for tilting the tiltably seated first mirror in relation to its center normal line inside a spatial angle which is considerably narrower than the hemisphere, and wherein the tiltably seated first mirror is embodied with reduced mass; and a light beacon installation at said first terminal for transmitting a search beam for facilitating initial detection of said first terminal by said second terminal, wherein a fiber-optical reflecting guide drum is arranged on the second rotating unit for connecting conductors moving with the first rotating unit and conductors moving with the light beacon installation.

13. The alignment device in accordance with claim 12, wherein said light beacon installation has at least two light beacon units.

* * * * *